US012251733B2

(12) United States Patent
Xia et al.

(10) Patent No.: US 12,251,733 B2
(45) Date of Patent: Mar. 18, 2025

(54) THREE-DIMENSIONAL SORTING ROBOT-BASED DATA PROCESSING METHOD AND THREE-DIMENSIONAL SORTING ROBOT

(71) Applicant: Zhejiang Libiao Robotics Co., Ltd., Zhejiang (CN)

(72) Inventors: Huiling Xia, Zhejiang (CN); Jianqiang Zhu, Zhejiang (CN); Juejing Xu, Zhejiang (CN); Ming Ma, Zhejiang (CN)

(73) Assignee: Zhejiang Libiao Robotics, Co., Ltd., Zhejiang (CN)

( * ) Notice: Subject to any disclaimer, the term of this patent is extended or adjusted under 35 U.S.C. 154(b) by 0 days.

(21) Appl. No.: 18/293,603

(22) PCT Filed: Mar. 31, 2022

(86) PCT No.: PCT/CN2022/084623
§ 371 (c)(1),
(2) Date: Jan. 30, 2024

(87) PCT Pub. No.: WO2023/015917
PCT Pub. Date: Feb. 16, 2023

(65) Prior Publication Data

US 2024/0335858 A1 Oct. 10, 2024

(30) Foreign Application Priority Data

Aug. 11, 2021 (CN) ........................ 202110920784.X

(51) Int. Cl.
*B07C 3/00* (2006.01)
*B07C 3/02* (2006.01)
*B07C 5/36* (2006.01)

(52) U.S. Cl.
CPC .............. *B07C 3/006* (2013.01); *B07C 3/005* (2013.01); *B07C 3/008* (2013.01); *B07C 3/02* (2013.01);
(Continued)

(58) Field of Classification Search
CPC ......... B07C 3/005; B07C 3/006; B07C 3/008; B07C 3/02; B07C 3/36; B07C 2501/0063
See application file for complete search history.

(56) References Cited

U.S. PATENT DOCUMENTS 7,331,471 B1 * 2/2008 Shakes .................... B07C 7/005 209/559
11,254,506 B1 * 2/2022 Robin ........................ B07C 3/18
(Continued)

FOREIGN PATENT DOCUMENTS

CN 204817212 U 12/2015
CN 207578414 U 7/2018
(Continued)

OTHER PUBLICATIONS

Search Report issued by the Chinese Patent Office for Application No. 202110920784X, filed Aug. 11, 2021, pp. 1-2.
(Continued)

*Primary Examiner* — Joseph C Rodriguez

(57) ABSTRACT

A three-dimensional sorting robot-based data processing method and a three-dimensional sorting robot and system are provided. According to the method, a three-dimensional sorting robot is provided with a processor and a sorting assembly. The data processing method comprises: an obtaining step: obtaining the identity information of a target sorting tack in real time, the identity information comprising structure data of the sorting tack and/or position information of basket units in the rack; a binding step: binding the identity information of the target sorting rack with the
(Continued)

information of a three-dimensional sorting robot, the binding relationship being associated with a target order executed by the three-dimensional sorting robot; and a sorting step: under a sorting task of the target order, sorting, by the sorting assembly according to the identity information of the rack by means of the processor, goods to be sorted.

20 Claims, 6 Drawing Sheets

(52) U.S. Cl.
CPC ........ *B07C 5/36* (2013.01); *B07C 2501/0063* (2013.01)

(56) References Cited

U.S. PATENT DOCUMENTS

| | | | | |
|---|---|---|---|---|
| 11,420,823 | B1 * | 8/2022 | Mehta | B65G 47/50 |
| 11,605,052 | B2 * | 3/2023 | Hwang | G06Q 10/08355 |
| 2006/0022824 | A1 | 2/2006 | Olsen, III et al. | |
| 2008/0264838 | A1 | 10/2008 | Limpens | |
| 2015/0235165 | A1 | 8/2015 | Miette et al. | |
| 2020/0055091 | A1 * | 2/2020 | Ma | B07C 3/08 |
| 2020/0167853 | A1 * | 5/2020 | Francis | G06Q 30/0281 |
| 2021/0179352 | A1 * | 6/2021 | Haid | B65G 65/00 |

FOREIGN PATENT DOCUMENTS

| | | | |
|---|---|---|---|
| CN | 110127144 | A | 8/2019 |
| CN | 110626691 | A | 12/2019 |
| CN | 110874669 | A | 3/2020 |
| CN | 111591661 | A | 8/2020 |
| CN | 113019959 | A | 6/2021 |
| CN | 113102260 | A | 7/2021 |
| CN | 113894048 | A | 1/2022 |
| CN | 114011723 | A | 2/2022 |
| CN | 114013891 | A | 2/2022 |

OTHER PUBLICATIONS

English translation of the International Search Report for International Application No. PCT/CN2022/084623 mailed Jun. 16, 2022, pp. 1-3.

English translation of the Written Opinion for International Application No. PCT/CN2022/084623 mailed Jun. 16, 2022, pp. 1-4.

* cited by examiner

THREE-DIMENSIONAL SORTING ROBOT-BASED DATA PROCESSING METHOD AND THREE-DIMENSIONAL SORTING ROBOT

CROSS-REFERENCE TO RELATED APPLICATIONS

The present disclosure claims priority to Chinese patent application with the filling No. 202110920784.X field with the Chinese Patent Office on Aug. 11, 2021, entitled "Data Processing Method Based on Three-Dimensional Sorting Robot and Three-Dimensional Sorting Robot," the contents of which are incorporated herein by reference in entirely.

TECHNICAL FIELD

The present disclosure relates to the technical field of sorting robot, and in particular relates to a data processing method based on three-dimensional sorting robot (i.e., a three-dimensional sorting robot-based data processing method) and three-dimensional sorting robot.

BACKGROUND ART

A sorting robot is a robot provided with sensors and recognition mechanisms, which executes sorting actions to quickly sort goods. The existing sorting robots are classified as a platform sorting robot or a sorting robotic arm. In a distribution center, express packages are put on a conveyor belt from a bag and then conveyed to a location of a destination corresponding to a sorting bag, and put into the sorting bag at the destination through dropping down or grabbing from the conveyor belt. In this way, the sorting is completed.

The current flat sorting system can complete a relatively efficient sorting after arranged. The three-dimensional sorting system is able to improve the sorting efficiency, so as to be applied more and more. However, as for the three-dimensional sorting system, the orders and identity (ID), structures or interaction characteristics of the sorting shelves need to be input one by one, which is not benefit to improve the sorting efficiency.

SUMMARY

Embodiments of the present disclosure provide a data processing method based on three-dimensional sorting robot and three-dimensional sorting robot, which effectively improve the sorting efficiency of the three-dimensional sorting system and achieve a technical effect of rapid deployment.

A data processing method based on the three-dimensional sorting robot is provided, wherein a processor and a sorting assembly can be provided on the three-dimensional sorting robot, and the data processing method can include:

an acquiring step, including acquiring identity information of a target sorting shelf in real time, wherein the identity information can include: a structure data of the sorting shelf and/or positional information of a basket unit in the shelf;

a binding step, including binding the identity information of the target sorting shelf to information of the three-dimensional sorting robot, wherein the binding relationship can be associated through a target order executed by the three-dimensional sorting robot; and a sorting step, including completing a sorting by the sorting assembly for the goods to be sorted through the processor according to the identity information of the sorting shelf under a sorting task of the target order.

Optionally, the method can further include:

acquiring attribute data of the basket unit of the sorting shelf, wherein the attribute data can include: one or a combination of more of dimensional data, volumetric data and type data; and matching the goods to be sorted in the target order according to the attribute data, and generating a correspondence relationship of the goods to be sorted and the basket unit.

Optionally, the acquiring step can further include:

acquiring the identity information of the target sorting shelf by a recognition device connected to the processor, wherein the identity information includes, but is not limited to, structure data of the sorting shelf and/or positional information of the basket unit, wherein:

the structure data of the sorting shelf can refer to a longitudinal and transversal structure of the sorting shelf and positional information of an available basket unit; and the positional information of the basket unit can refer to a position of the basket unit in a coordinate system composed of the sorting shelf.

Optionally, the step of completing the sorting by the sorting assembly for the goods to be sorted through the processor according to the identity information of the shelf under the sorting task of the target order includes:

parsing sorting information of the goods to be sorted, wherein the sorting information can carry a correspondence relationship with a certain basket unit in the sorting shelf;

looking up a correspondence relationship, and acquiring a coordinate value of the basket unit in a three-dimensional coordinate system composed of the sorting shelf; and indexing the coordinate value and positioning, and putting the goods to be sorted into the basket unit.

Optionally, the correspondence relationship can be stored in the three-dimensional sorting robot and the sorting step can further include: performing a searching based on a form of correspondence relationship table according to whether the order is finished, to compete a putting for the goods to be sorted.

Optionally, the data processing method can further include:

querying a sorting shelf number corresponding to current goods to be sorted; and preparing to put into the sorting shelf when the sorting shelf number is consistent with the bound sorting shelf number.

Optionally, the method can further include: an order updating step, including:

updating a current order condition to be completed when all goods of the target order are put; and releasing the binding relationship of a current sorting shelf and the three-dimensional sorting robot; and continuing to complete the next order by the three-dimensional sorting robot, and binding the three-dimensional sorting robot with the identity information of new sorting shelf.

Optionally, the binding relationship between the current sorting shelf and the three-dimensional sorting robot can be realized by inserting the current sorting shelf into a position of the three-dimensional sorting robot, and the binding relationship between the current sorting shelf and the three-dimensional sorting robot can be released by pulling out the current sorting shelf from the three-dimensional sorting robot.

Optionally, during a period of executing the target order, the binding relationship between the three-dimensional sorting robot and the target sorting shelf can be sole.

Optionally, a plurality of sorting shelves can be provided, wherein the three-dimensional sorting robot can acquire the identity information of each of sorting shelves or basket units in real time, and the relationship of the three-dimensional sorting robot, the order being executed and the bound sorting shelf or the basket unit can also be stored and updated.

A sorting robot can include:

an acquiring unit, configured to acquire the identity information of the target sorting shelf in real time, wherein the identity information can include: a structure data of the sorting shelf and/or positional information of the basket unit in the shelf;

a binding unit, configured to bind the identity information of the target sorting shelf to information of the sorting robot, wherein the binding relationship is associated through the target order executed by the three-dimensional sorting robot; and a sorting unit, configured to complete the sorting for the goods to be sorted through the processor according to the identity information of the shelf under the sorting task of the target order.

Optionally, the acquiring unit can also be configured for acquiring attribute data of the basket unit of the sorting shelf, wherein the attribute data can include: one or a combination of more of the dimensional data, volumetric data and type data; and matching the goods to be sorted in the target order according to the attribute data, and generating the correspondence relationship of the goods to be sorted and the basket unit.

Optionally, the acquiring unit can be realized by a radio frequency identification (RFID) reader, and the acquiring unit can also be configured for:

acquiring the identity information through reading a label provided on the sorting shelf, wherein, the structure data of the sorting shelf can refer to a longitudinal and transversal structure of the sorting shelf and information of an available basket unit; and the positional information of the basket unit can refer to a position of the basket unit in a coordinate system composed of the sorting shelf.

Optionally, the sorting unit can further be configured for:

parsing the sorting information of the goods to be sorted, wherein the sorting information can carry the correspondence relationship with certain basket unit in the sorting shelf;

looking up the correspondence relationship, and acquiring the coordinate value of the basket unit in the three-dimensional coordinate system composed of the sorting shelf; and indexing the coordinate value and positioning, and putting the goods to be sorted into the basket unit.

A three-dimensional sorting system can include: the three-dimensional sorting robot and sorting shelf, wherein the three-dimensional sorting robot can execute the above data processing method based on the three-dimensional sorting robot.

A computing device can include:

at least one processor; and a memory communicatively connected to the at least one processor, wherein the memory can store an instruction, which can be executed by the at least one processor, and the instruction is executed by the at least one processor, so that the at least one processor can execute the above data processing method based on the three-dimensional sorting robot.

The data processing method based on the three-dimensional sorting robot, three-dimensional sorting robot and system disclosed in the present disclosure acquire the identity information of the target sorting shelf in real time; bind the identity information of the target sorting shelf to the information of the sorting robot, and make association with the target order; and complete the sorting by the sorting assembly for the goods to be sorted through the processor according to the identity information of the shelf under the sorting task of the target order. In the present disclosure, in case of different baskets or sorting shelves, or sorting shelves with complex or messy structure for the sorting robot, the sorting can be completed through recognizing the information of different baskets or sorting shelves. It is more important that the sorting robot can be interacted in real time based on the order, which not only is free of the arrangement for control system, but also greatly reduces the risk of reduced sorting efficiency caused by the delay of the data transmission and identification.

BRIEF DESCRIPTION OF DRAWINGS

The drawings illustrated herein are used to provide a further understanding of the present disclosure, which constitute a part of the present disclosure. The schematic embodiments of the present disclosure and illustrations thereof are used to explain the present disclosure, and do not constitute an undue limitation of the present disclosure. The drawings are as follows.

DETAILED DESCRIPTION OF EMBODIMENTS

Figure 1A:
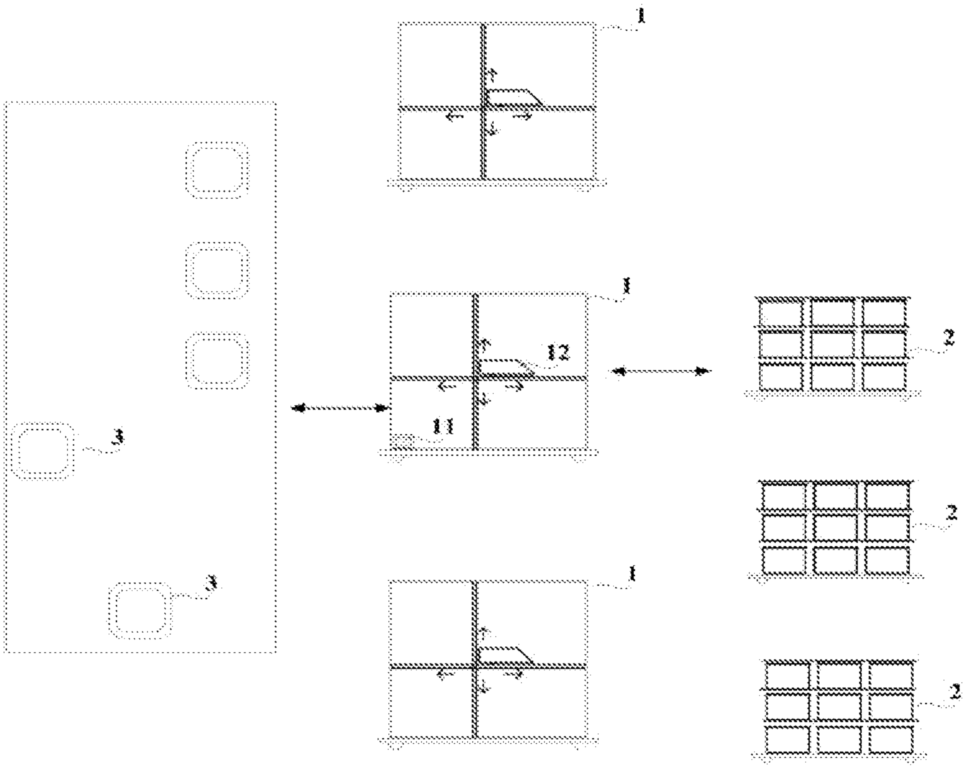
FIG. 1*a* shows a structure schematic diagram of the three-dimensional sorting system in the embodiments of the present disclosure.

Embodiments of the present disclosure provide a data processing method based on three-dimensional sorting robot, three-dimensional sorting robot and system, which effectively improve the sorting efficiency of the three-dimensional sorting system and achieves a technical effect of rapid deployment.

In conjunction with FIG. 1*a*, the three-dimensional sorting system in the embodiments of the present disclosure is illustrated below. In the present disclosure, the three-dimensional sorting system can include three-dimensional sorting robots 1 and sorting shelves 2. As an optional embodiment, a plurality of three-dimensional sorting robots 1 can be provided, and installed in a sorting field through an active way by a bus (e.g., CAN). The sorting shelf can be in contact communication with the three-dimensional sorting robot by inserting and pulling out. Of course, the data exchange can also be completed in a wireless and contactless method, which is not limited herein. The sorting robot 1 can recognize and execute the sorting task by support frame, transverse movable mechanism and longitudinal movable mechanism for the sorting shelf with the three-dimensional multilayer structure. At the same time, the sorting robot 1 can be provided with a turning plate 12 or a structure assembly of putting the goods into the sorting shelf, and can cooperate with a desktop sorting robot 3 or a flat sorting robot to execute the sorting task based on a certain batch order. More importantly, the three-dimensional sorting robot uses the processor 11 to deal with the sorting batch and sorting order at the same time, which can achieve in real time the binding relationship between the three-dimensional sorting robot and the sorting shelf. Regarding the binding for a certain order of certain batch, the three-dimensional sorting robot completes to cooperatively control the order and the real-time bound sorting shelf, which significantly improves convenience of the arrangement and speed of the sorting.

Figure 1B:
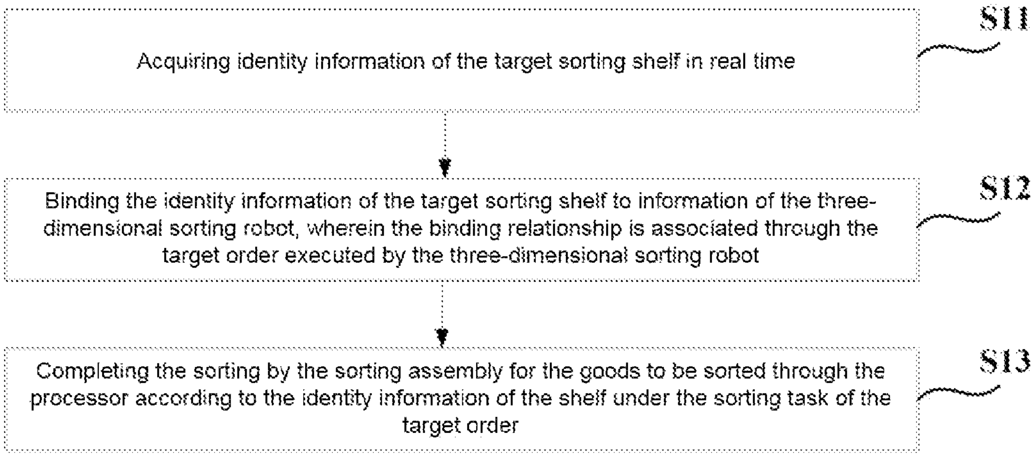
FIG. 1*b* shows a flow schematic diagram of the data processing method based on the three-dimensional sorting robot in the embodiments of the present disclosure.

Based on this, referring to FIG. 1*b*, the data processing method based on the three-dimensional sorting robot of the present disclosure can include the following steps.

Acquiring step S11: acquiring an identity information of a target sorting shelf in real time, wherein the identity information can include: a structure data of the sorting shelf and/or positional information of the basket unit in the shelf.

Figure 1C:
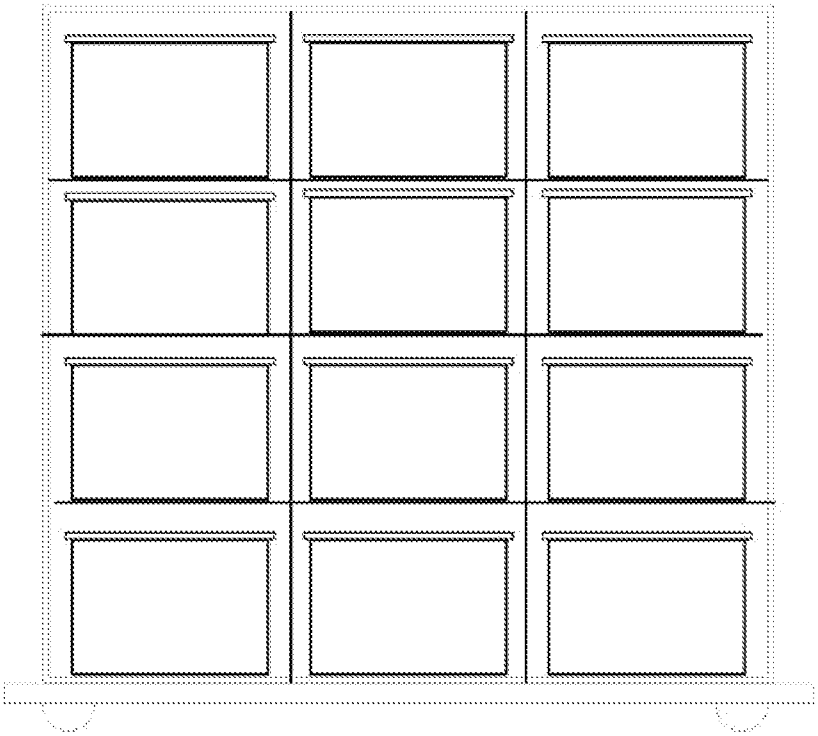
FIG. 1*c* shows a structure schematic diagram of the three-dimensional sorting shelf in the embodiments of the present disclosure.

Referring to the illustration of FIG. 1*c*, in a three-dimensional sorting system, a plurality of sorting shelves can be provided. For example, if the current target sorting shelf is labelled as 001, the identity information thereof includes at least a structure data of the sorting shelf. If a structure of shelf 001 includes 4 rows and 3 columns, and after recognized by the three-dimensional sorting robot, the goods to be sorted need to be put into the basket at the third row and the second column, the three-dimensional sorting robot, based on a sequence of a plurality of orders required to be finished, for example, from the order A001 to the order A010, can be in communication with the sorting shelf in real time that is cooperated with the three-dimensional sorting robot in a sorting field. The three-dimensional sorting robot utilizes the processor to complete the interaction of the identity information with the sorting shelf, and utilizes the sorting assembly to put the goods just according to the structure data and the positional information. The structure data can also be distinguished by a type of the sorting shelf, e.g., type X001 refers to a rectangular sorting shelf including 4 rows and 3 columns, and type Y001 refers to a rectangular sorting shelf including 8 rows and 5 columns.

Binding step S12: binding the identity information of the target sorting shelf to information of the three-dimensional sorting robot, wherein the binding relationship is associated through the target order executed by the three-dimensional sorting robot.

It should be noted that, if a certain order A002 contains 10,000 sorting tasks, during the sorting process for the sorting tasks of the order A002, the three-dimensional sorting robot needs to be bound to the target sorting shelf 001 to complete an accurate sorting for goods.

In order to manage and acquire data for the batch, order and whether the order is finished by the three-dimensional sorting robot, in the embodiment, the three-dimensional sorting robot can acquire the identity information of each of sorting shelves or basket units in real time, and store and update the relationship of the three-dimensional sorting robot, the order being executed and the bound sorting shelf or the basket.

Sorting step S13: completing the sorting by the sorting assembly for the goods to be sorted through the processor according to the identity information of the shelf under the sorting task of the target order.

Figure 1D:
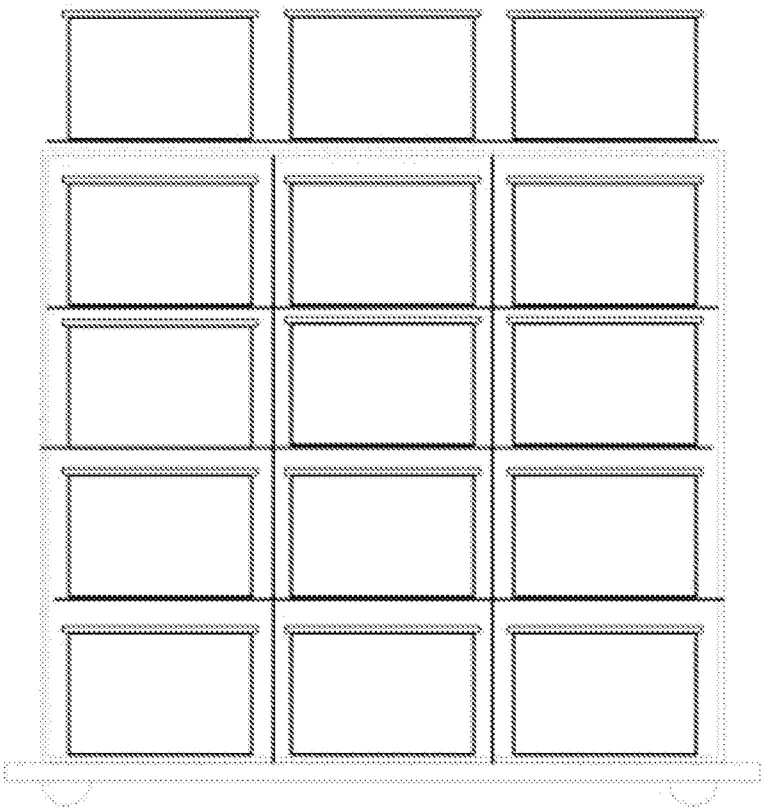
FIG. 1*d* shows a structure schematic diagram of the three-dimensional sorting shelf in the embodiments of the present disclosure.

Referring to FIGS. 1*d* and 1*n* conjunction with FIG. 1*c*, in the present disclosure, the sorting shelf can be the sorting shelf or basket with any structure or shape. The conventional sorting shelf or basket will be configured according to different goods or different sorting lines, so that the structures of the sorting shelves often are not uniform, which are even spliced together by the plurality of shelves. In order to acquire more detailed information of the sorting shelf, the embodiment further can include the following steps.

Figure 2:
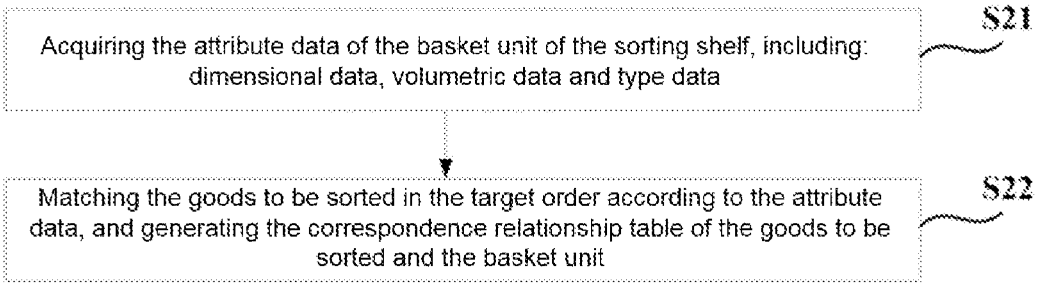
FIG. 2 shows a flow schematic diagram of the data processing method based on the three-dimensional sorting robot in the embodiments of the present disclosure.

Referring to FIG. 2,

S21: acquiring the attribute data of the basket unit of the sorting shelf, wherein the attribute data can include: one or a combination of more of the dimensional data, volumetric data and type data.

In order to allocate the baskets for a convenient, rapid and suitable sorting for the goods to be allocated, it is necessary to acquire the dimension, volume and type of each of the basket units to allocate the corresponding sorting task.

S22: matching the goods to be sorted in the target order according to the attribute data, and generating the correspondence relationship of the goods to be sorted and the basket unit.

Each of the goods to be sorted can have the correspondence relationship with one or more basket units based on the sorting task, and the sorting robot can complete the accurate sorting based on the task of current order and by utilizing the identity information and the binding relationship acquired in real time.

For the acquiring step in FIG. 1, the identity information of the target sorting shelf can be acquired by a recognition device connected to the processor, wherein the identity information includes, but is not limited to, the structure data of the sorting shelf and/or the positional information of the basket unit.

The structure data of the sorting shelf can indicate the longitudinal and transversal structure of the sorting shelf and information of the available basket.

The positional information of the basket unit can indicate the position of the basket unit in the coordinate system composed of the sorting shelf.

The method of acquiring the identity information of the sorting shelf in real time by the three-dimensional sorting robot can be realized in form of reading the RFID. That is to say, the processor of the three-dimensional sorting robot controls RFID read module, and the movable sorting shelf is provided in the three-dimensional sorting system. Preferably, when the three-dimensional sorting robot 001 is executing the sorting task of the order A002, the three-dimensional sorting robot needs at least 9 three-dimensional sorting shelves (sorting shelves) to complete the order.

When the three-dimensional sorting shelf of type X001 is configured to sort, the three-dimensional sorting robot 001 automatically reads the RFID label of the three-dimensional sorting shelf X010 in real time, which can complete the real-time information interaction with the three-dimensional sorting robot by means of a rail used for the automatic transfer of the sorting shelves (which is not limited thereto). Of course, the labeled card of the RFID configured to the target sorting shelf may only store an ID of the target sorting shelf, and the structure data thereof and/or the positional information of the basket unit can be stored in the processor of the three-dimensional sorting robot, which is matched according to ID.

The three-dimensional sorting robot 001 reads that the target rectangular sorting shelf is of a type of X001 (the type X001 refers to a 4-row and 3-column rectangular sorting shelf). It is obtained by reading that the target rectangular sorting shelf has 12 available baskets distributed in 4 rows and 3 columns. Since the target sorting shelf is divided based on the coordinate system, the 12 available baskets ban be noted respectively in such way: X1Y1 (1,1) characterizes the basket at the first row and the first column, X1Y2 (1,2) characterizes the basket at the first row and the second column, . . . , until X4Y3 (4,3) characterizes the basket at the fourth row and the third column.

It is noted particularly that, during the period of executing the target order A002, the binding relationship of the three-dimensional sorting robot and the target sorting shelf can be sole, i.e., after the three-dimensional sorting robot 001 completes the sorting for the three-dimensional sorting shelf X010, the three-dimensional sorting shelf is to be recognized and the target order A002 is to be executed subsequently.

Figure 3:
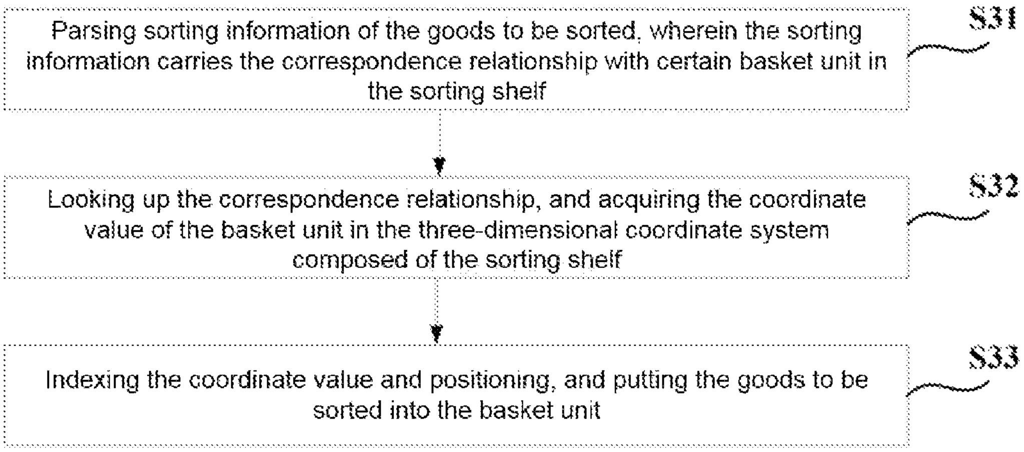
FIG. 3 shows a flow schematic diagram of the data processing method based on the three-dimensional sorting robot in the embodiments of the present disclosure.

Referring to FIG. 3, the sorting step can be realized by the following method.

S31: parsing the sorting information of the goods to be sorted, wherein the sorting information carries the correspondence relationship with certain basket unit in the sorting shelf.

S32: looking up the correspondence relationship, and acquiring the coordinate value of the basket unit in the three-dimensional coordinate system composed of the sorting shelf.

S33: indexing the coordinate value and positioning, and putting the goods to be sorted into the basket unit.

The above steps can be executed based on the above illustrations of FIG. 1 to FIG. 2 and examples thereof. Of course, it is not limited to put certain goods to be sorted through reading identity information by RFID and looking up the correspondence relationship. The correspondence relationship is stored in the three-dimensional sorting robot, and a search is carried out based on the correspondence relationship table according to whether the order is finished, so as to put the goods to be sorted.

Figure 4:
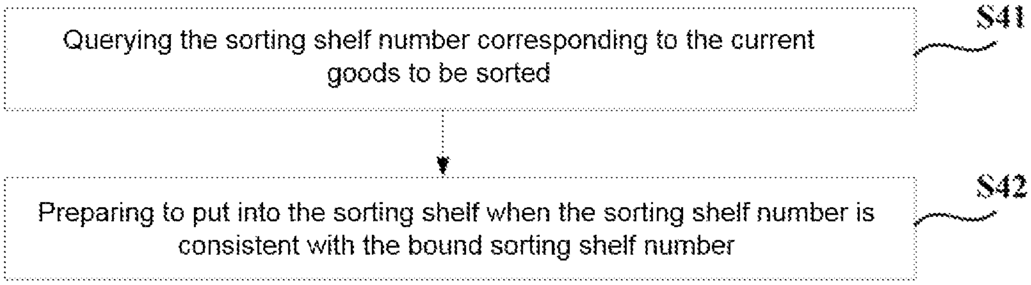
FIG. 4 shows a flow schematic diagram of the data processing method based on the three-dimensional sorting robot in the embodiments of the present disclosure.

Referring to FIG. 4, it shows a flow about recognizing the sorting shelf in the present disclosure, which can include the following steps.

S41: querying the sorting shelf number corresponding to the current goods to be sorted.

S42: preparing to put into the sorting shelf when the sorting shelf number is consistent with the bound sorting shelf number.

Before the sorting robot executes the sorting action shown in FIG. 3 and the corresponding illustration, the steps in FIG. 4 is executed.

Following the above example, before the three-dimensional sorting robot 001 puts the certain goods to be sorted, it is necessary to confirm whether the sorting shelf or the sorting basket where the used basket is located is the bound one. If it is recognized that it is put into a wrong sorting shelf or wrong sorting basket, a second confirmation or a fault alarm is executed, so as to avoid the occurrence of putting errors.

Figure 5:
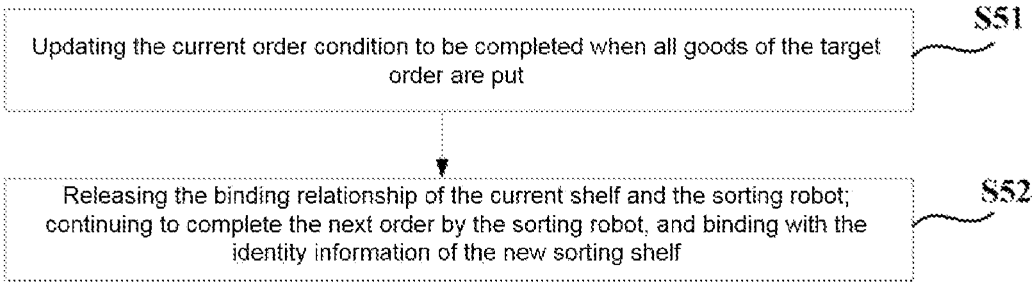
FIG. 5 shows a flow schematic diagram of the data processing method based on the three-dimensional sorting robot in the embodiments of the present disclosure.

Referring to FIG. 5, it shows a flow about recognizing the sorting shelf in the present disclosure, which can include: an order updating step.

S51: updating the current order condition to be completed when all goods of the target order are put.

After the three-dimensional sorting robot 001 completes the putting task of order 002, the three-dimensional sorting robot 001 updates the current condition of the order 002 from “ongoing” to “complete”, and continues to execute the other orders of the batch.

S52: releasing the binding relationship of the current shelf and the sorting robot. The sorting robot continues to complete the next order and binds the identity information of new sorting shelf.

Optionally, in the system under the bus structure, the binding relationship of the current shelf and the sorting robot can be realized by inserting the current shelf into the sorting robot position, and the binding relationship of the current shelf and the sorting robot can be released by pulling out the current shelf from the sorting robot. It should be emphasized that this method is a preferred method.

In order to facilitate the order management, it is necessary to release the binding relationship of the sorting robot to the current shelf when the order 002 is completed. If the sorting task for the next order exists, the sorting robot will execute the steps and instructions shown in FIG. 1, which will not be repeated in the embodiment.

Figure 6:
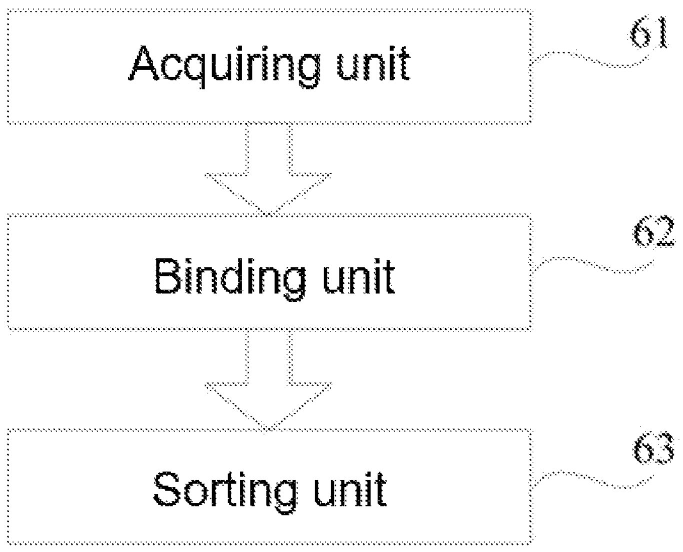
FIG. 6 shows a structure schematic diagram based on the three-dimensional sorting robot in the embodiments of the present disclosure.

FIG. 6 shows a sorting robot, which can include the following units.

The acquiring unit 61 can be configured to acquire the identity information of the target sorting shelf in real time, which can include: the structure data of the sorting shelf and/or the positional information of the basket unit in the shelf.

The acquiring unit can be preferably realized by a RFID reader, and the acquiring unit can also be configured for:

acquiring the identity information through reading the label provided on the target sorting shelf, wherein the identity information includes, but is not limited to, the structure data of the sorting shelf and/or the positional information of the basket unit, wherein, the structure data of the sorting shelf can refer to a longitudinal and transversal structure of the sorting shelf and positional information of an available basket unit; and the positional information of the basket unit can refer to a position of the basket unit in a coordinate system composed of the sorting shelf.

Of course, it is not limited to this method of acquiring the identity information of the sorting shelf. The hardware solution corresponding to acquiring unit can be realized by multiple methods, such as remote reading device, contact reading device, visual recognition module, etc.

The binding unit 62 can be configured to bind the identity information of the target sorting shelf to the information of the sorting robot, wherein the binding relationship is associated through the target order executed by the three-dimensional sorting robot.

The sorting robot can be realized by means of the processor+ memory. In order to manage and acquire data for the batch, order and completion situation of the order, in the embodiment, the sorting robot can store and update the relationship of the three-dimensional sorting robot and the order being executed, the bound sorting shelf or the basket by acquiring the identity information of each of the sorting shelves or baskets in real time.

The sorting unit 63 can be configured to complete the sorting by the sorting assembly for the goods to be sorted through the processor according to the identity information of the shelf under the sorting task of the target order.

The sorting unit 63 can further be configured for:

parsing the sorting information of the goods to be sorted, wherein the sorting information can carry the correspondence relationship with certain basket unit in the sorting shelf;

looking up the correspondence relationship, and acquiring the coordinate value of the basket unit in the three-dimensional coordinate system composed of the sorting shelf; and indexing the coordinate value and positioning, and putting the goods to be sorted into the basket unit.

The hardware device corresponding to the sorting unit can be selected as follows: support frame, transverse movable mechanism and longitudinal movable mechanism for the sorting robot 1 can recognize and execute the sorting task for the sorting shelf with the three-dimensional multi-layer structure. At the same time, the sorting robot 1 can be provided with a turning plate or a structure assembly 12 of putting the goods into the sorting shelf and can cooperate with a desktop sorting robot or a flat sorting robot to execute the sorting task based on a certain batch order.

Figure 7:
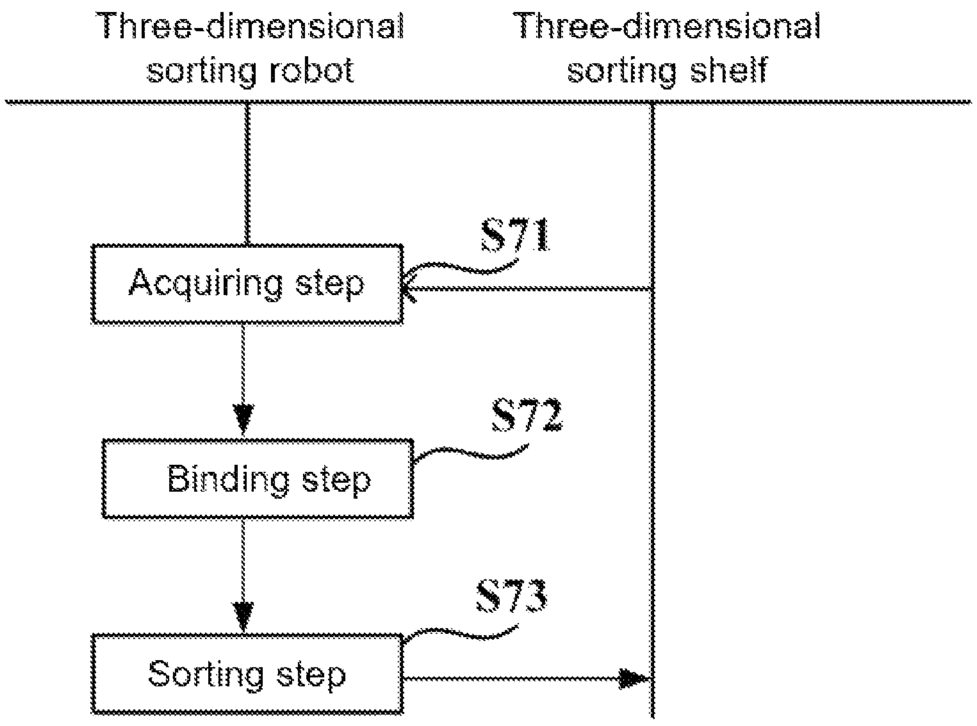
FIG. 7 shows a structure schematic diagram of the readable medium in the embodiments of the present disclosure.

Referring to FIG. 7 and also referring to FIG. 1*a*, in the three-dimensional sorting system of embodiments of the present disclosure, the three-dimensional sorting system can include the three-dimensional sorting robot and sorting shelf. In a sorting field, a plurality of three-dimensional sorting robots can be provided, and the sorting robots 1 executes the following steps by the processor 11 or a computing device.

The acquiring step 71 includes acquiring the identity information of the target sorting shelf in real time, wherein the identity information can include: the structure data of the sorting shelf and/or the positional information of the basket unit in the shelf.

The sorting robot executes the acquiring step, which is specifically realized by:

acquiring the identity information of the target sorting shelf in real time by the recognition device connected to the processor 11, wherein the identity information includes, but is not limited to, the structure data of the sorting shelf and/or positional information of the basket unit, wherein, the structure data of the sorting shelf can refer to a longitudinal and transversal structure of the sorting shelf and positional information of an available basket; and the positional information of the basket unit can refer to a position of the basket unit in a coordinate system composed of the sorting shelf.

The binding step 72 includes binding the identity information of the target sorting shelf to the information of the sorting robot, wherein the binding relationship is associated with the target order through executing by the three-dimensional sorting robot.

The sorting step 73 includes completing the sorting by the sorting assembly for the goods to be sorted through the processor according to the identity information of the shelf under the sorting task of the target order. The sorting robot executes the sorting step, which is specifically realized by:

parsing the sorting information of the goods to be sorted, wherein the sorting information can carry the correspondence relationship with certain basket unit in the sorting shelf;

looking up the correspondence relationship, and acquiring the coordinate value of the basket unit in the three-dimensional coordinate system composed of the sorting shelf; and indexing the coordinate value and positioning, and putting the goods to be sorted into the basket unit.

The three-dimensional sorting robot can further execute the releasing and order updating steps:

updating the current order condition to be completed when all goods of the target order are put; and releasing the binding relationship of a current shelf and the sorting robot, wherein the sorting robot continues to complete the next order and binds the identity information of new sorting shelf.

Figure 8:
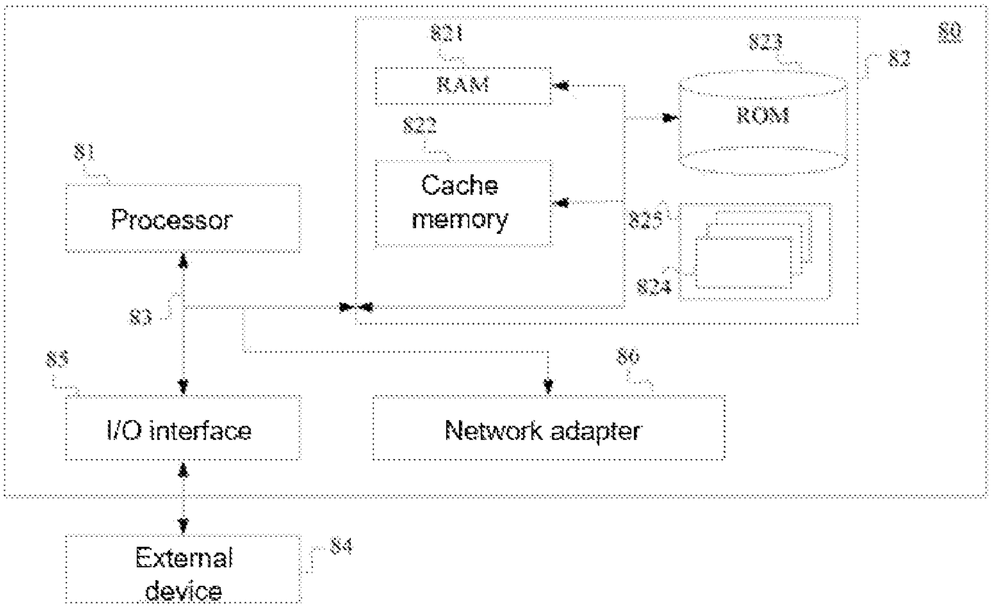
FIG. 8 shows a structure schematic diagram of the computing device in the embodiments of the present disclosure.

FIG. 8 shows the computing device 80 matched with the method in FIGS. 1 to 5.

It should be noted that, the computing device 80 shown in FIG. 8 is only an example, which should not bring any limitation to the function and the scope of use of the embodiments of the present disclosure.

As shown in FIG. 8, the three-dimensional sorting robot can be represented in form of a general-purpose computing device 80. The components of the computing device 80 can include, but are not limited to: the at least one processor 81 foregoing, the at least one memory 82 foregoing and the bus 83 connecting different system components (including the memory 82 and the processor 81).

The bus 83 can represent one or more of several types of bus structures, and the bus 83 can include the memory bus or memory-controller bus, peripheral bus, processor bus or local area bus using any one of the multiple bus structures.

The memory 82 can include a readable medium in form of volatile memory, such as random-access memory (RAM) 821 and/or cache memory 822, and can further optionally include a read-only memory (ROM) 823.

The memory 82 can further include a program/utility tool 825 with a group (at least one) of program modules 824. The program module 824 includes, but is not limited to: an operating system, one or more application programs, other program module and program data, wherein each or certain combination of the examples can include the function of realizing the network environment.

The computing device 80 can also be in communication with one or more external devices 84 (e.g., keyboard, pointing device, etc.), and can also be in communication with one or more devices that enable the user can be interacted with the computing device 80, and/or can be in communication with any device (e.g., router, modem, etc.) that enables the computing device 80 to communicate with one or more other computing devices. The communication can be executed through an input/output (I/O) interface 85. Furthermore, the computing device 80 can further be in communication with one or more networks (e.g., a local area network (LAN), wide area network (WAN) and/or public network, such as the Internet) through a network adapter 88. As shown in the drawing, the network adapter 88 is in communication with other modules used for the computing device 80 through the bus 83. It should be understood that, although not shown in the drawing, other hardware and/or software module can be used in conjunction with the computing device 80, which includes but is not limited to: microcode, device driver, redundant processor, external disk driving array, RAID system, magnetic tape driver, and data backup storage system, etc.

In some possible embodiments, the computing device according to the present disclosure can include at least one processor and at least one memory (provided in the processor of the three-dimensional sorting robot). The memory stores program code, so that the processor executes the steps in the system privilege opening method according to various exemplary embodiments of the present disclosure described above in the specification when the program code is executed by the processor.

Figure 9:
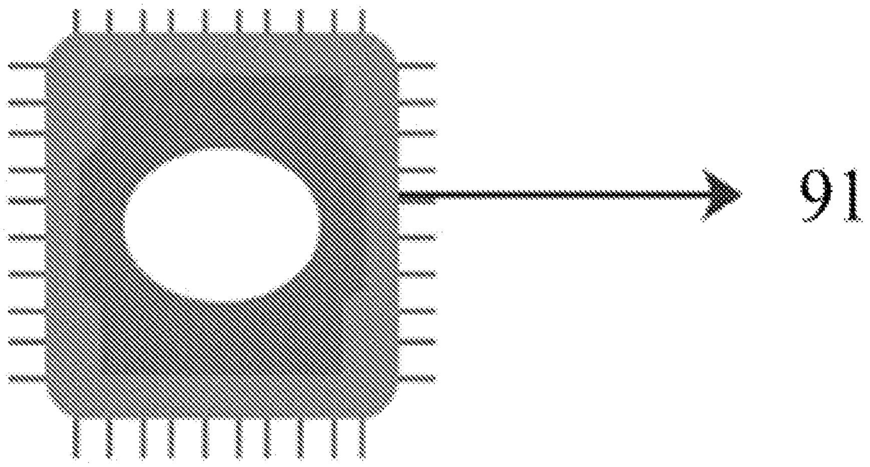
FIG. 9 shows a structure schematic diagram of the readable medium in the embodiments of the present disclosure.

Referring to FIG. 9, the data processing method based on the three-dimensional sorting robot shown in FIG. 1 to FIG. 5 and the corresponding embodiments can also be realized through a computer readable medium 91. Referring to FIG. 9, the computer readable medium stores the computer executable instruction, i.e., the program instruction to be executed by the three-dimensional sorting robot in the method of the present disclosure. The computer or high-speed chip can execute that the instruction is written into the processor of the three-dimensional sorting robot or the computing device, so as to execute the data processing method based on the three-dimensional sorting robot described in the foregoing embodiment.

The readable signal medium can include the data signal propagated in baseband or as a part of the carrier, which carries the readable program code therein. The data signal can be propagated by multiple forms, which includes, but is not limited to, electromagnetic signal, optical signal or any suitable combination of the foregoing. The readable signal medium can also be any readable medium besides the readable storage medium. The readable medium can send, propagate or transmit the program, which is configured to be used by, or used in combination with the instruction execution system, device or component.

The program code included in the readable medium can be transmitted by any suitable medium, which includes, but is not limited to, wireless medium, wired medium, optical cable and radio frequency (RF), etc., or any suitable combination of the foregoing.

The program code for executing the operation of the present disclosure can be written by any combination of one or more programming languages, wherein the programming languages include the object-oriented programming languages, such as Java, C++, etc., and also include the conventional procedural programming languages, such as the "C" language or the similar programming languages. The program code can be executed entirely on the user computing device, partially on the user device, as a standalone software package, partially on the user computing device and partially on the remote computing device.

The program product can be consisted of any combination of one or more readable media. The readable medium can be the readable signal medium or the readable storage medium. The readable storage medium can be, but is not limited to, e.g., a system, control device or component of electricity, magnetism, optics, electromagnetism, infrared ray or semiconductor, or any combination of the above. The more specific examples of readable storage media (a non-exhaustive list) include: an electrical connection with one or more wires, portable disk, hard disk, random access memory (RAM), read-only memory (ROM), erasable programmable read-only memory (EPROM or flash memory), optical fiber, portable compact disk read-only memory (CD-ROM), optical storage component, magnetic storage component, or any suitable combination of the above.

The program product for system privilege opening of the embodiments of the present disclosure can adopt the portable CD-ROM and the program code thereon, which can run on the computing device. However, the program product of the present disclosure is not limited thereto. In the present disclosure, the readable storage medium can be any tangible medium including or storing the program, which can be used by or in combination with the instruction execution system, control device or component.

The present disclosure is described with reference to the method, and device (system) in the embodiments of the present disclosure, and the flow diagrams and/or block diagrams of the computer program products. It is to be understood that, the computer program instruction can realize each process and/or block of the flow diagrams and/or block diagrams, and combinations of the processes and/or blocks in the blocks and the flow diagrams and/or block diagrams. The computer program instructions can be provided to a general-purpose computer, a special-purpose computer, an embedded processor or a processor of other programmable data processing device to produce a machine, so that the instructions executed by the computer or the processor of other programmable data processing device produce a device, which is configured to realize the specified functions one or more processes in the flow diagrams and/or one or more blocks in the block diagrams.

The computer program instructions can also be stored in a computer-readable memory that can direct the computer or other programmable data processing device to run in a particular method, so that the instructions stored in the computer-readable memory produce the product including the instruction device, wherein the instruction device realizes the specified function of one or more processes in the flow diagrams and/or one or more blocks in the block diagrams.

The computer program instructions can also be loaded into the computer or the other programmable data processing device, so that the computer or the other programmable device executes a series of operational steps to realize the function by the computer, so that the instructions executed by the computer or the other programmable device provide the steps, which are configured to realize the specified function in one or more processes in the flow diagrams and/or one or more block in the block diagrams.

The preferred embodiments of the present disclosure are described above, but those skilled in the art can make other changes and modifications for the embodiments once the primary inventive concepts are known. Therefore, the appended claims are intended to include the preferred embodiments and all changes and modifications falling within the scope of the present disclosure.

Obviously, those skilled in the art can make various changes and variations for the present disclosure without departing from the spirit and scope of the present disclosure. Therefore, if the changes and variations of the present disclosure fall within the scope of the claims of the present disclosure and the equivalent technologies thereof, the present disclosure is intended to include these changes and variations as well.

INDUSTRIAL APPLICABILITY

The present disclosure discloses a data processing method based on three-dimensional sorting robot, three-dimensional sorting robot and system, wherein the method includes: a processor and a sorting assembly provided in the three-dimensional sorting robot, wherein the data processing method includes: an acquiring step, including acquiring identity information of a target sorting shelf in real time, wherein the identity information can include: a structure data of the sorting shelf and/or positional information of the basket unit in the shelf; a binding step, including binding the identity information of the target sorting shelf to information of the three-dimensional sorting robot, wherein the binding relationship is associated through a target order executed by the three-dimensional sorting robot; and a sorting step, including completing the sorting by the sorting assembly for the goods to be sorted through the processor according to the identity information of the shelf under the sorting task of the target order. The sorting robot can interact in real time based on the order, which is free of the arrangement for control system and improves the efficiency of the data transmission and sorting.

Furthermore, it can be understood that, the data processing method based on three-dimensional sorting robot, three-dimensional sorting robot and system of the present disclosure are reproducible and can be used in multiple types of industrial applications. For example, the data processing method based on three-dimensional sorting robot, three-dimensional sorting robot and system of the present disclosure can be used in the technical field of the sorting robot.

The invention claimed is:

1. A data processing method based on a three-dimensional sorting robot, wherein a processor and a sorting assembly are provided on the three-dimensional sorting robot and the data processing method comprises:

an acquiring step, implemented by the three-dimensional sorting robot, comprising acquiring identity information of a target sorting shelf in real time, wherein the identity information comprises: a structure data of the sorting shelf and/or positional information of a basket unit in the sorting shelf;

a binding step, implemented by the sorting shelf and the three-dimensional sorting robot, comprising binding the identity information of the target sorting shelf to information of the three-dimensional sorting robot, wherein the binding relationship is associated through a target order executed by the three-dimensional sorting robot; and a sorting step, implemented by the three-dimensional sorting robot, comprising completing a sorting by the sorting assembly for goods to be sorted through the processor according to the identity information of the sorting shelf under a sorting task of the target order;

wherein the acquiring step further comprises:

parsing sorting information of the goods to be sorted, and putting the goods to be sorted according to a coordinate value of the basket unit in the sorting shelf.

2. The data processing method based on the three-dimensional sorting robot according to claim 1, further comprising:

acquiring attribute data of the basket unit of the sorting shelf, wherein the attribute data comprise: one or a combination of more of dimensional data, volumetric data and type data; and matching the goods to be sorted in the target order according to the attribute data, and generating a correspondence relationship of the goods to be sorted and the basket unit.

3. The data processing method based on the three-dimensional sorting robot according to claim 1, wherein the acquiring step further comprises:

acquiring the identity information of the target sorting shelf by a recognition device connected to the processor, wherein the structure data of the sorting shelf refer to a longitudinal and transversal structure of the sorting shelf and positional information of an available basket unit; and the positional information of the basket unit refers to a position of the basket unit in a coordinate system composed of the sorting shelf.

4. The data processing method based on the three-dimensional sorting robot according to claim 3, wherein the step of completing a sorting by the sorting assembly for goods to be sorted through the processor according to the identity information of the sorting shelf under a sorting task of the target order comprises:

parsing sorting information of the good to be sorted, wherein the sorting information carries a correspondence relationship with a certain basket unit in the sorting shelf;

looking up the correspondence relationship, and acquiring the coordinate value of the basket unit in a three-dimensional coordinate system composed of the sorting shelf; and indexing the coordinate value and positioning, and putting the goods to be sorted into the basket unit.

5. The data processing method based on the three-dimensional sorting robot according to claim 4, wherein the correspondence relationship is stored in the three-dimensional sorting robot and the sorting step further comprises: performing a searching based on a form of a correspondence relationship table according to whether the order is finished, to compete the putting for the goods to be sorted.

6. The data processing method based on three-dimensional sorting robot according to claim 4, further comprising:

querying a sorting shelf number corresponding to current goods to be sorted; and preparing to put into the sorting shelf when the sorting shelf number is consistent with a bound sorting shelf number.

7. The data processing method based on the three-dimensional sorting robot according to claim 1, further comprising: an order updating step, comprising updating a current order condition to be completed when all goods of the target order are put;

releasing a binding relationship of a current sorting shelf and the three-dimensional sorting robot; and continuing to complete a next order by the three-dimensional sorting robot, and binding the three-dimensional sorting robot with identity information of a new sorting shelf.

8. The data processing method based on the three-dimensional sorting robot according to claim 7, wherein the binding relationship of the current sorting shelf and the three-dimensional sorting robot is realized by inserting the current sorting shelf into a position of the three-dimensional sorting robot, and the binding relationship of the current sorting shelf and the three-dimensional sorting robot is released by pulling out the current sorting shelf from the three-dimensional sorting robot.

9. The data processing method based on the three-dimensional sorting robot according to claim 7, wherein during a period of executing the target order, the binding relationship of the three-dimensional sorting robot and the target sorting shelf is sole.

10. The data processing method based on the three-dimensional sorting robot according to claim 1, wherein a plurality of sorting shelves are provided, wherein the three-dimensional sorting robot acquires identity information of each of the sorting shelves or basket units in real time, and a relationship of the three-dimensional sorting robot, an order being executed and a bound sorting shelf or basket unit is stored and updated.

11. A sorting robot, comprising:

an acquiring unit, configured to acquire identity information of a target sorting shelf in real time, wherein the identity information comprises: a structure data of the sorting shelf and/or positional information of a basket unit in the sorting shelf;

a binding unit, configured to bind the identity information of the target sorting shelf to information of the three-dimensional sorting robot, wherein the binding relationship is associated through a target order executed by the three-dimensional sorting robot; and a sorting unit, configured to complete a sorting for goods to be sorted through a processor according to the identity information of the shelf under a sorting task of the target order, wherein the acquiring unit is further configured for:

parsing sorting information of the goods to be sorted, and putting the goods to be sorted according to a coordinate value of the basket unit in the sorting shelf.

12. The sorting robot according to claim 11, wherein the acquiring unit is further configured for:

acquiring attribute data of the basket unit of the sorting shelf, wherein the attribute data comprise: one or a combination of more of dimensional data, volumetric data and type data; and matching the goods to be sorted in the target order according to the attribute data, and generating a correspondence relationship of the goods to be sorted and the basket unit.

13. The sorting robot according to claim 12, wherein the acquiring unit is realized by a RFID reader, and the acquiring unit is further configured for:

acquiring the identity information through reading a label provided on the sorting shelf, wherein the structure data of the sorting shelf refer to a longitudinal and transversal structure of the sorting shelf and information of an available basket unit; and the positional information of the basket unit refers to a position of the basket unit in a coordinate system composed of the sorting shelf.

14. The sorting robot according to claim 13, wherein the sorting unit is further configured for:

parsing sorting information of the goods to be sorted, wherein the sorting information carries a correspondence relationship with a certain basket unit in the sorting shelf;

looking up the correspondence relationship, and acquiring a coordinate value of the basket unit in a three-dimensional coordinate system composed of the sorting shelf; and indexing the coordinate value and positioning, and putting the goods to be sorted into the basket unit.

15. A three-dimensional sorting system, comprising:

a three-dimensional sorting robot comprising a processor and a sorting assembly; and a sorting shelf, wherein the three-dimensional sorting robot is configured to acquire identity information of a target sorting shelf in real time, wherein the identity information comprises: a structure data of the sorting shelf and/or positional information of a basket unit in the sorting shelf;

wherein the sorting shelf and three-dimensional robot are configured to bind the identity information of the target sorting shelf to information of the three-dimensional sorting robot, wherein the binding relationship is associated through a target order executed by the three-dimensional sorting robot;

wherein the three-dimensional sorting robot is configured to complete a sorting task for goods to be sorted through the sorting assembly according to the identity information of the sorting shelf under a sorting task of the target order; and wherein the three-dimensional sorting robot is configured to parse sorting information of the goods to be sorted, and put the goods to be sorted according to a coordinate value of the basket unit in the sorting shelf.

16. The data processing method based on the three-dimensional sorting robot according to claim 2, wherein the acquiring step further comprises:

acquiring the identity information of the target sorting shelf by a recognition device connected to the processor, wherein the structure data of the sorting shelf refer to a longitudinal and transversal structure of the sorting shelf and positional information of an available basket unit; and the positional information of the basket unit refers to a position of the basket unit in a coordinate system composed of the sorting shelf.

17. The data processing method based on three-dimensional sorting robot according to claim 5, further comprising:

querying a sorting shelf number corresponding to current goods to be sorted; and preparing to put into the sorting shelf when the sorting shelf number is consistent with a bound sorting shelf number.

18. The data processing method based on the three-dimensional sorting robot according to claim 2, further comprising: an order updating step, comprising updating a current order condition to be completed when all goods of the target order are put;

releasing a binding relationship of a current sorting shelf and the three-dimensional sorting robot; and continuing to complete a next order by the three-dimensional sorting robot, and binding the three-dimensional sorting robot with identity information of a new sorting shelf.

19. The data processing method based on the three-dimensional sorting robot according to claim 8, wherein during a period of executing the target order, the binding relationship of the three-dimensional sorting robot and the target sorting shelf is sole.

20. The data processing method based on the three-dimensional sorting robot according to claim 2, wherein a plurality of sorting shelves are provided, wherein the three-dimensional sorting robot acquires identity information of each of the sorting shelves or basket units in real time, and a relationship of the three-dimensional sorting robot, an order being executed and a bound sorting shelf or basket unit is stored and updated.

* * * * *